(12) United States Patent
Baghel et al.

(10) Patent No.: US 10,531,353 B2
(45) Date of Patent: Jan. 7, 2020

(54) MINIMIZATION OF RESOURCE ALLOCATION DELAY FOR V2X APPLICATION

(71) Applicant: QUALCOMM Incorporated, San Diego, CA (US)

(72) Inventors: Sudhir Kumar Baghel, Bridgewater, NJ (US); Shailesh Patil, Raritan, NJ (US); Kapil Gulati, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 15/254,390

(22) Filed: Sep. 1, 2016

(65) Prior Publication Data

US 2017/0099624 A1   Apr. 6, 2017

Related U.S. Application Data

(60) Provisional application No. 62/237,455, filed on Oct. 5, 2015.

(51) Int. Cl.
*H04W 36/32* (2009.01)
*H04W 36/00* (2009.01)
(Continued)

(52) U.S. Cl.
CPC ............. *H04W 36/32* (2013.01); *H04W 4/70* (2018.02); *H04W 36/0016* (2013.01); *H04W 36/14* (2013.01); *H04W 76/14* (2018.02)

(58) Field of Classification Search
CPC .............. H04W 36/32; H04W 76/023; H04W 36/0072; H04W 4/005; H04W 36/14; H04W 36/0016; H04W 48/12
See application file for complete search history.

(56) References Cited

U.S. PATENT DOCUMENTS 9,705,991 B2 *   7/2017   Mader ..................... H04L 67/12
2014/0220979 A1   8/2014   Song et al.
(Continued)

FOREIGN PATENT DOCUMENTS

WO   2014173429 A1   10/2014
WO   2015095580 A1   6/2015

OTHER PUBLICATIONS

3GPP TSG RAN WG1 Meeting #78, Dreden, Germany, Aug. 18-22, 2014, Source: ASUSTek, Title: Discussion of D2D mode 2 SA allocation, R1-143345 (Year: 2014).*
(Continued)

*Primary Examiner* — Mohammad S Anwar
(74) *Attorney, Agent, or Firm* — Arent Fox LLP

(57) ABSTRACT

In an aspect an apparatus receives information as part of a handover command, the information received from a serving cell and including radio resource information used in a neighboring cell for V2X communications. Additionally, the apparatus transmits, from the UE, a request for V2X communication resources as part of a handover command. In another aspect an apparatus transmits a serving cell SIB to a UE, the SIB including a reception pool. The apparatus transmits a cell ID in the serving cell SIB for a neighboring cell. The reception pool is a transmission pool for the neighboring cell. The apparatus relinquishes a communication with the UE to a base station in the neighboring cell.

29 Claims, 11 Drawing Sheets

(51) Int. Cl.
    *H04W 36/14*     (2009.01)
    *H04W 76/14*     (2018.01)
    *H04W 4/70*     (2018.01)

(56) References Cited

U.S. PATENT DOCUMENTS

| | | | |
|---|---|---|---|
| 2015/0195827 A1 | 7/2015 | Feng et al. | |
| 2015/0282210 A1* | 10/2015 | Li | H04W 74/004 |
| | | | 455/436 |
| 2016/0212793 A1* | 7/2016 | Jung | H04W 76/14 |

OTHER PUBLICATIONS

Partial International Search Report—PCT/US2016/050241—ISA/EPO—dated Oct. 24, 2016.
Huawei, et al., "Resource Configuration for Inter-Carrier Discovery Transmission", 3GPP Draft; R2-154546 Resource Configuration for Inter-Carrier Discovery Transmission, 3rd Generation Partnership Project (3GPP), Mobile Competence Centre; 650, Route Des Lucioles; F-06921 Sophia-An, vol. RAN WG2, No. Malmo, Sweden; Oct. 5, 2015-Oct. 9, 2015, Oct. 4, 2015 (Oct. 4, 2015), pp. 1-4, XP051005080, Retrieved from the Internet: URL: http://www.3gpp.org/ftp/Meetings_3GPP_SYNC/RAN2/Docs/ [retrieved on Oct. 4, 2015].
International Search Report and Written Opinion—PCT/US2016/050241—ISA/EPO—dated Jan. 17, 2017.

\* cited by examiner

MINIMIZATION OF RESOURCE ALLOCATION DELAY FOR V2X APPLICATION

CROSS-REFERENCE TO RELATED APPLICATION(S)

This application claims the benefit of U.S. Provisional Application Ser. No. 62/237,455, entitled "MINIMIZATION OF RESOURCE ALLOCATION DELAY FOR V2X APPLICATION" and filed on Oct. 5, 2015, which is expressly incorporated by reference herein in its entirety.

BACKGROUND

Field

The present disclosure relates generally to communication systems, and more particularly, to a vehicle-to-X (V2X) communication system.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Some communications, particularly vehicle-to-vehicle (V2V) or V2X communications may be sensitive to communication delays. Accordingly, reducing delays in V2V and/or V2X communications may be advantageous.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The relatively high speed of vehicles including communication systems and the high density of vehicles including communication systems, particularly in urban environments, where the number of vehicles including communication systems in an area may be high, may lead to frequent handovers in LTE Mode 1 communication and/or frequent cell reselection in LTE Mode 2 communication. Handover and reselection may disrupt communication. As discussed above, some communications, particularly V2V or V2X communications may be sensitive to communication delays. For example, some communication systems may be sensitive to allocation delays, e.g., delays in an allocation during handover and reselection. Accordingly, reducing communication delays such as allocation delays may be advantageous.

In an aspect of the disclosure, a method, a computer program product, and an apparatus are provided. The apparatus (e.g., a UE) receives, at the UE, information as part of a handover command, the information received from a serving cell and including radio resource information used in a neighboring cell for V2X communications. Additionally, the apparatus transmits, from the UE, a request for V2X communication resources.

In another aspect of the disclosure, a method, a computer program product, and an apparatus are provided. The apparatus (e.g., a base station) transmits a serving cell SIB to a UE, the SIB including a reception pool. The apparatus transmits a cell ID in the serving cell SIB for a neighboring cell. The reception pool is a transmission pool for the neighboring cell. The apparatus relinquishes a communication with the UE to a base station in the neighboring cell.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
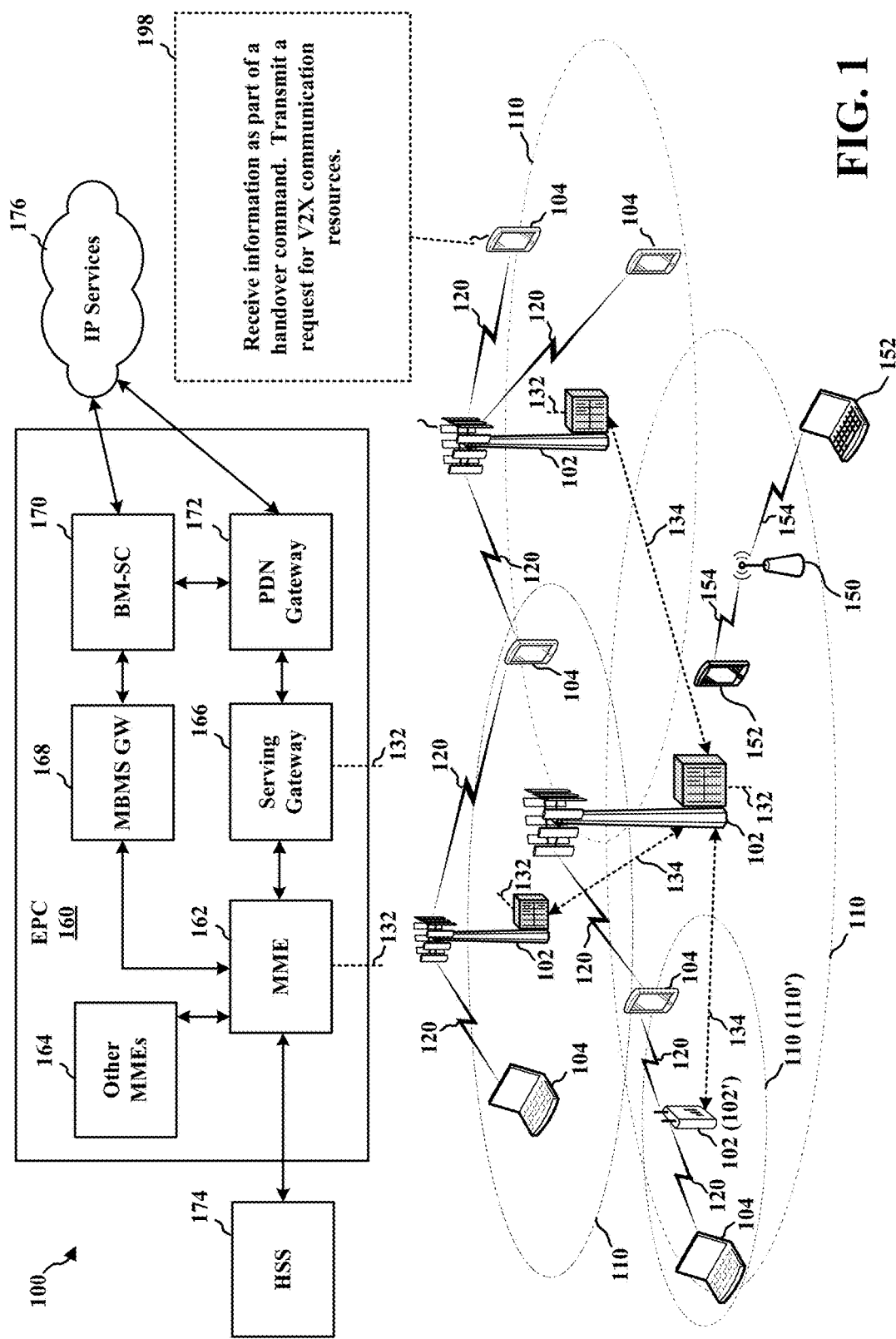
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

The term "exemplary" is not to be construed as preferred or best.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to receive information as part of a handover command. The information received from a serving cell may include radio resource information used in a neighboring cell for V2X communications. Additionally, the UE 104 may transmit a request for V2X communication resources, e.g., based on receiving the information as part of a handover command. The UE may, in some examples, transmit a list of resources based on the radio resource information. The list of resources includes at least one of the following resources: Mode 1 resources of a target cell, Mode 2 resources of the target cell, SPS information resources, or exception pool resources (198).

In another aspect, the base station 102 may transmit a SIB reception pool for a serving cell to a UE 104. The base station 102 may transmit a cell ID of a neighboring cell in the serving cell SIB. The reception pool is a transmission pool for the neighboring cell. The base station 102 relinquishes a communication with the UE 104 to a base station 102 in the neighboring cell.

Figure 2:
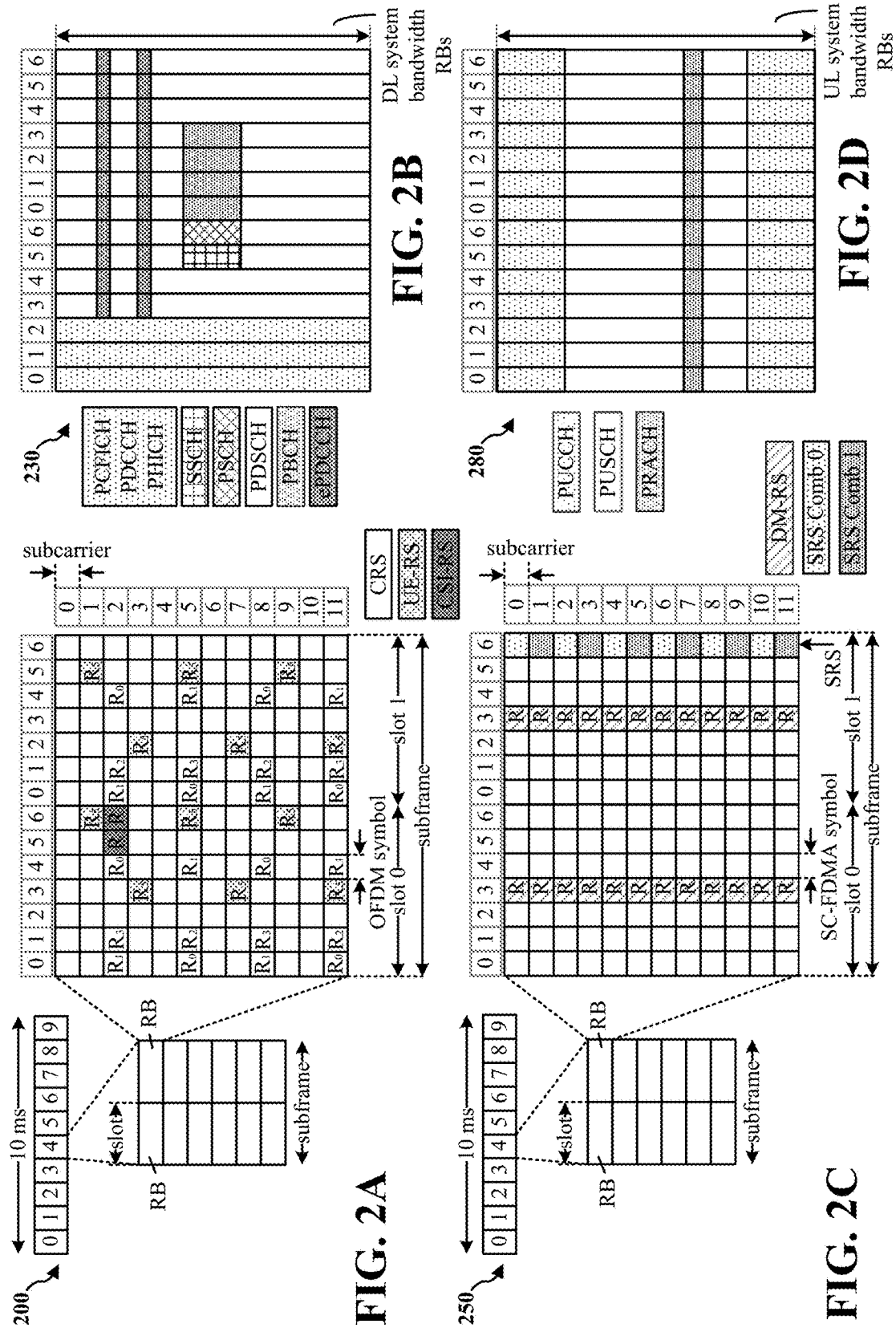
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and R$_3$, respectively), UE-RS for antenna port 5 (indicated as R$_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
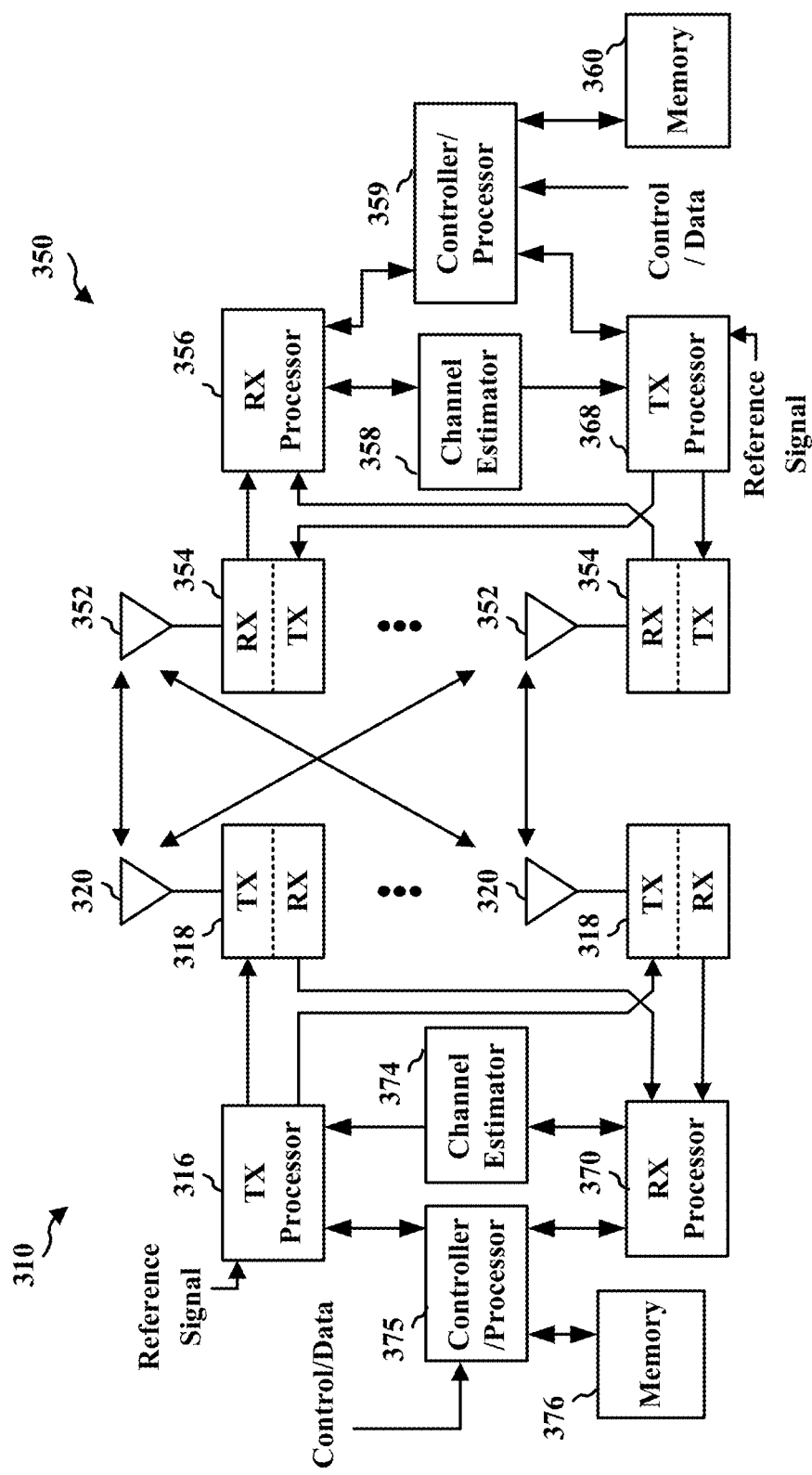
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through the receiver's respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
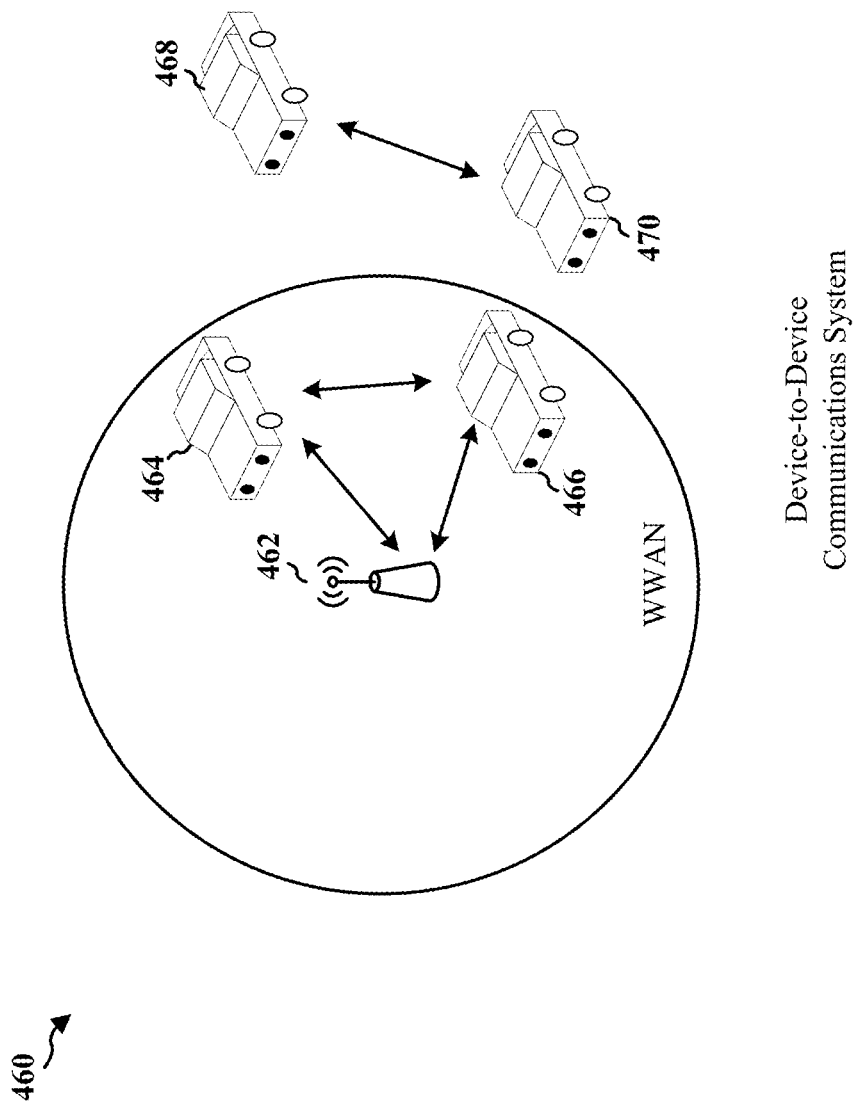
FIG. 4 is a diagram of a device-to-device communications system.

FIG. 4 is a diagram of a device-to-device (D2D) communications system 460. The D2D communications system 460 may include a plurality of UEs 464, 466, 468, 470. The D2D communications system 460 may overlap with a cellular communications system, such as for example, a WWAN. Some of the UEs 464, 466, 468, 470 may communicate together in D2D communication using the DL/UL WWAN spectrum, some may communicate with the base station 462, and some may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Figure 5:
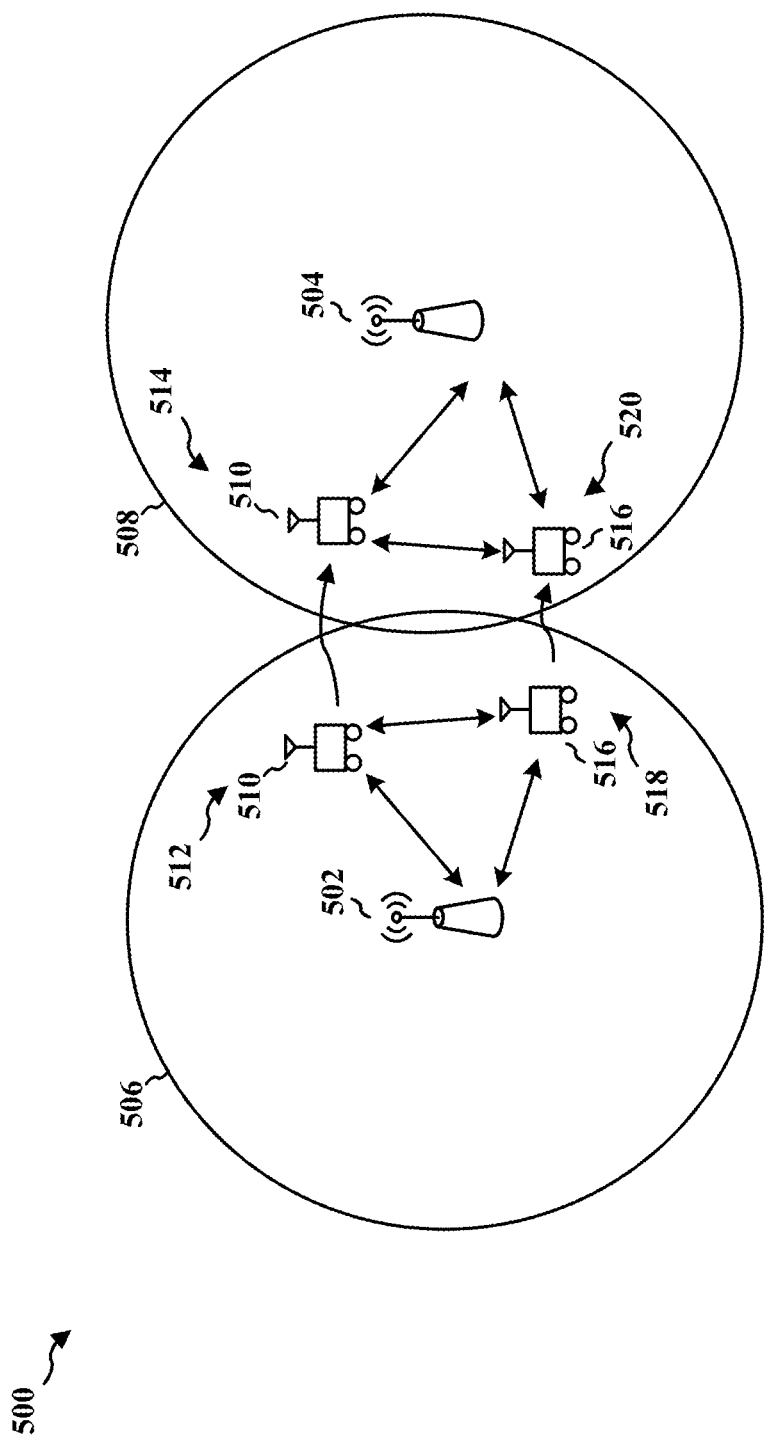
FIG. 5 is a diagram a V2X communications system such as vehicle-to-vehicle (V2V) communications system in accordance with this disclosure.

FIG. 5 is a diagram of a V2X communications system 500 such as a vehicle-to-vehicle (V2V) communications system in accordance with this disclosure. The vehicle-to-vehicle communications system 500 may include a first base station 502 and a second base station 504. The first base station 502 may be part of a first cell 506. The second base station may be part of a second cell 508. A first vehicle 510 may be travelling from a first location 512 in the first cell 506 to a second location 514 in the second cell 508. A second vehicle 516 may be travelling from a third location 518 in the first cell 506 to a fourth location 520 in the second cell 508.

As the first vehicle 510 travels from the first location 512 in the first cell 506 to the second location 514 in the second cell 508, a handover may be occur and/or may be needed. For example, initially, the first vehicle 510 may be in communications with the first base station 502. As the first vehicle 510 travels from the first location 512 in the first cell 506 to the second location 514 in the second cell 508, the first vehicle 510 may go from being able to communicate with the first base station 502 to not being able to communicate with the first base station 502, e.g., because of distance, obstructions, or other factors that may impact the range of the base station 502, 504, or local reception of signals from the base station 502, 504. Accordingly, because the first vehicle 510 may not be able to communicate with the first base station 502 (or may be predicted to become unable to communicate with the first base station 502), the first vehicle 510 may need to communicate with the second base station 504. Thus, a handover from the first base station 502 to the second base station 504 may occur.

As the second vehicle 516 travels from the third location 518 in the first cell 506 to the fourth location 520 in the second cell 508 a handover may be occur and/or may be needed. For example, initially, the second vehicle 516 may be in communications with the first base station 502. As the second vehicle 516 travels from the third location 518 in the first cell 506 to the fourth location 520 in the second cell 508, the second vehicle 516 may go from being able to communicate with the first base station 502 to not being able to communicate with the first base station 502. Accordingly, because the second vehicle 516 may not be able to communicate with the first base station 502 (or may be predicted to become unable to communicate with the first base station 502), the second vehicle 516 may need to communicate with the second base station 504. Thus, a handover from the first base station 502 to the second base station 504 may occur.

Additionally, as the first vehicle 510 travels from the first location 512 in the first cell 506 to the second location 514 in the second cell 508 and as the second vehicle 516 travels from the third location 518 in the first cell 506 to the fourth location 520 in the second cell 508, the first vehicle 510 and the second vehicle 516 may be in a V2V communication, e.g., with each other. The V2V communication may be similar to D2D communication using 3GPP Release 12 or other D2D communications.

For device-to-device (D2D) communication using 3GPP Release 12, there are two different D2D communication modes. One of the two D2D communication modes, which is referred to as Mode 1, is the eNodeB (eNB) scheduled mechanism mode. The other of the two modes, which is referred to as Mode 2, is the UE autonomous selection mode. In Mode 1, for each D2D Mode 1 transmission that a UE wants to perform, the UE sends a request for D2D communication to the serving eNB. The eNB may then approve the request for D2D communication and assign time-frequency resources for the D2D communication. In Mode 2, the eNB transmits a resource pool to one or more UEs. The resource pool may be a list of time-frequency resources that are available for use for D2D communications. The eNB may transmit the resource pool to one or more UEs, e.g., using a Random Access Channel (RACH) or using dedicated signaling, to name only two examples. In Mode 2, after receiving the resource pool from the eNB, a UE that wants to perform a D2D transmission may select a time-frequency resource from the resource pool to use for the D2D Mode 2 communications.

V2V communications may have a high number of devices in a small area, i.e., a high density of devices. For example, a large number of vehicles may be traveling along a highway or freeway. Additionally, vehicles using V2V communications may be moving at relatively high speeds, e.g., highway speeds, such as, for example, 55 miles-per-hour or faster.

Because V2V communications may have a high number of devices in a small area, i.e., a high density of devices, because the vehicles may be moving at high speeds, and because of the nature of the transmissions, periodic transmission of fixed size safety messages and/or event driven messages, changes to current communications standards used for V2V communication may be needed in order to tailor a communications system for V2V communications.

3GPP Release 12 D2D Mode 1 operation for communication may be based on dynamic scheduling. Dynamic scheduling may require a Scheduling Request (SR), a RACH, sidelink Buffer Status Report (BSR), or some combination of an SR, a RACH, or sidelink BSR to be sent from a UE to a base station in order for a UE to get resources for sidelink transmissions. 3GPP Release 12 device-to-device (D2D) Mode 1 may provide a baseline for V2V communication. However, certain characteristics of V2V communication should be taken into account for enhancement of Mode 1 for V2V communication.

As summarized above, when compared to other types of D2D communications, V2V communications may have some distinct characteristics. Some examples of the distinct characteristics of V2V are:

Vehicle density in a given area may be quite large compared to what was originally assumed for Rel-12 D2D. Accordingly, V2V communications may have a higher density of devices, e.g., devices in vehicles, communicating with other devices in vehicles.

Vehicles can be moving at very high speed (e.g., 87 miles per hour/140 kilometers per hour) relative to, for example, pedestrians.

V2V traffic may include periodic transmission of fixed size safety messages (e.g. Cooperative Awareness Message (CAM)) and event driven messages (e.g. Decentralized Environmental Notification Message (DENM)). The periodic transmissions may have a known pattern, e.g., the time for the transmissions may follow a pattern that is known. Additionally, because event driven messages are used, semi-persistent scheduling may be needed. (Mode 1 under 3GPP Release 12 D2D does not have semi-persistent scheduling.)

Because V2V communications may have a higher density of devices, because the vehicles may be moving at high speeds, and because of the nature of the transmissions, periodic transmission of fixed size safety messages and changes to event driven messages may be needed to tailor communications in a communications system for V2V communications.

A sizeable portion, e.g., a high percentage, such as 20%, 40%, 60% or more, of V2V traffic may occur with a known periodic pattern. Because a sizeable portion of V2V traffic occurs with a known periodic pattern, semi persistent scheduling of V2V communications may reduce overall overhead needed to schedule V2V communications, e.g., transmissions between a UE and other devices such as other UEs or base stations.

Additionally, in V2V communications, the high speed of vehicles and/or the high density of devices using V2V communications may lead to an increased number of handovers, more frequent handovers, or both, e.g., in the case of Mode 1, where use of a single antenna port may make it difficult for a UE to compensate for the high speed or high density. (Use of multiple antennas may allow for connections to a single eNB in a single cell to function over a longer range or in higher density environments where interference may be higher.) For example, a vehicle traveling at high speed may travel through more cells in a shorter amount of time as compared a vehicle moving more slowly. As a vehicle travels from one cell to another cell, a handover may be occur and/or may be needed. Thus, higher speed may result in a UE traveling through more cells, which may lead to more frequent handovers. In V2V communications, high vehicle speed and/or high vehicle density may lead to more frequent cell reselection for Mode 2 V2V communication. Handover and reselection may cause an interruption in V2V communications. Interruptions in V2V communication may not be desirable and/or may not be allowed for some V2V messages. For example, some V2V messages may be delay sensitive such as V2V safety messages.

A handover may interrupt communications. For example, a target eNB may not be able to provide resources for device-to-device communication during a handover. Interruptions in communications may lead to a delay. Driverless cars may be particularly sensitive to delays in V2V communications. If a driverless car is delayed in transmitting information or receiving information, the driverless car may be more likely to be involved in an accident, may shut down, or may operate in some other less preferable manner. For example, the driverless car may not receive a stop command because of a delay. Not receiving a stop command may lead to an accident. Similarly, the driverless car may be unable to warn other vehicles to stop. Accordingly, an accident may occur.

In one example, a mechanism to reduce resource allocation delay for V2X communication may be provided. For example, a user equipment (UE), e.g., a communication device in vehicle 510, 516, indicates to a base station, e.g., eNodeB (eNB), that the UE needs resources for a V2V (or V2X) application. The UE may communicate the need for resources for a V2V (or V2X) application in a message such as a SidelinkUEInformation Radio Resource Control (RRC) message. The UE may also provide vehicle speed to eNB. The UE may also provide Semi-Persistent Scheduling (SPS) details to eNB. In some examples, with SPS an eNB may automatically provide resources needed by a UE.

During a handover, a source eNB, e.g., base station 502, may provide transmission resources on behalf of a target eNB, e.g., base station 504. For example, for Mode 1 communications, the source eNB may provide Mode 1 resources of the target cell. In another example, for Mode 2 communications, the source eNB may provide Mode 2 resources of the target cell such as the Mode 2 resource pool. In another example, for SPS communications, the source eNB may provide SPS resources including, for example, a SPS V2V Radio Network Temporary Identifier (RNTI) to a UE. In some examples, the SPS V2V RNTI may be provided in an RRCConnectionReconfiguration message.

In some examples, the UE may use the provided resources, e.g., the Mode 1 resources of the target cell, Mode 2 resources of the target cell, SPS resources of the target cell, after or only after the UE synchronizes to the target cell. Accordingly, the UE may use resources that belong to the target cell before a handover is completed, as long as the UE has synchronized with the target cell. For example, a UE may listen to messages for any cell the UE is synchronized with in order to determine system information.

The serving cell may provide reception pool information in a SIB. A reception pool may be a pool of time-radio resources of a current cell and/or a pool of time-radio resources of any other cells for which a UE has information or any other cells with which the UE may communicate. For example, the reception pool may include time-radio resources for the serving cell and any time-radio resources of neighboring cells of the serving cell. To avoid delay in reading a SIB transmitted by a target cell during reselection, the serving cell SIB may also indicate the cell identification (ID) of a neighboring cell for which the reception pool is a transmission pool. The cell ID identifies the neighboring cell. The neighboring cell has an eNB. Accordingly, the cell ID provides an indication of the eNB to which a transmission pool belongs, i.e., the eNB of the cell identified by the cell ID. A transmission pool for a particular cell is a pool of radio resources, e.g., frequency-time resources, which a UE may utilize for D2D communication when the UE is in the particular cell (or when the UE is synchronized with the particular cell, when allowed). The serving cell SIB may also indicate if the reception pool may be used as a transmission pool in the indicated neighboring cell for transmitting messages before reading the SIB of the neighboring cell, e.g., during a cell change, e.g., a handover.

Alternatively, in an example, the serving cell SIB may also indicate if the reception pool may be used only for urgent messages before reading the SIB of the neighboring cell or if the reception pool may be used for all messages. Additionally, the serving cell SIB may indicate how long serving cell SIB may be used before reading the SIB of the neighboring cell. The length of time the serving cell SIB may be used before reading the SIB of the neighboring cell may be based on the speed of a UE. The speed of the UE may impact the time between cell changes, e.g., handovers. The time between cell changes may determine the maximum amount of time the serving cell SIB is valid.

In another example, an exception pool may be provided by the source eNB. The exception pool may be used during handover/reselection before a UE receives resources from the target cell as part of the handover/reselection. The exception pool may be a pool of time-frequency resources that may be used only for urgent messages. Additionally, information about the exception pool may be provided, such as how long the exception pool may be used. In some examples, how long an exception pool may be used may be indicated in terms of time or number of messages. In some examples, the exception pool is a pool of radio resources, e.g., frequency-time resources, which a UE may not normally utilize for D2D communication when the UE is in the particular cell (or when the UE is synchronized to that particular cell, when allowed). Exceptions to the limitation on the use of the exception pool resources may be made in some examples for urgent messages. In some examples radio resources, e.g., frequency-time resources, which are not in the exception pool may be utilized for D2D communication when the UE is in that particular cell (or when the UE is synchronized to the particular cell, when allowed).

Figure 6:
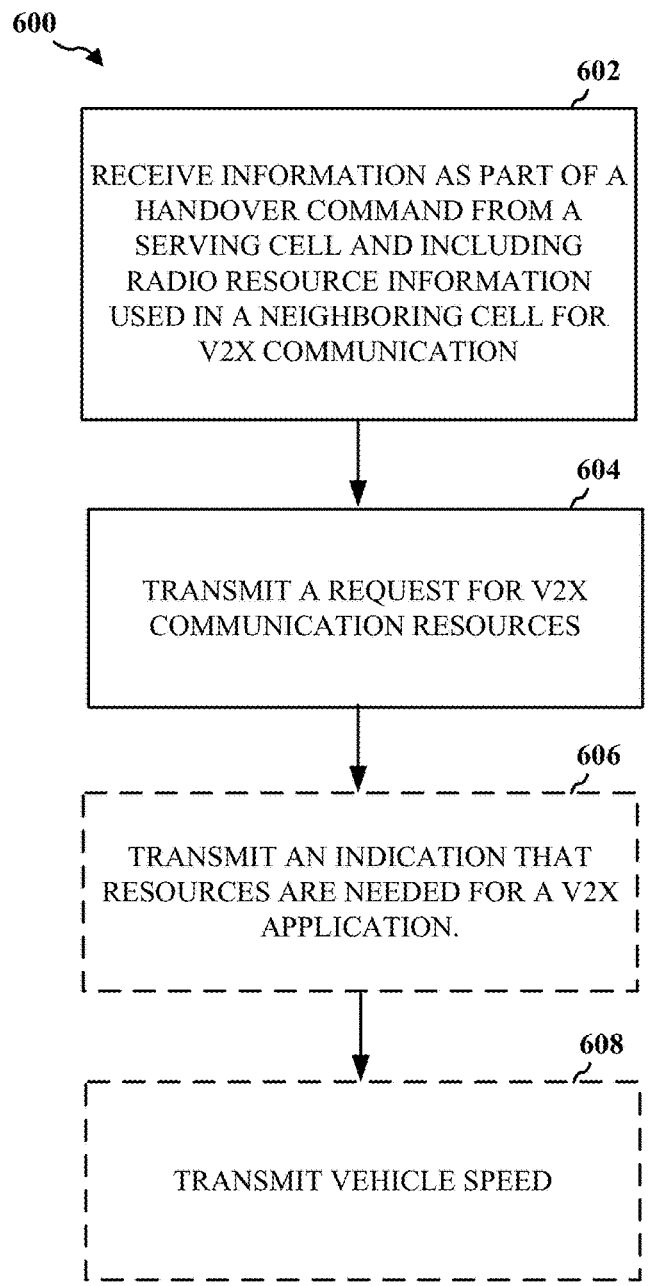
FIG. 6 is a flowchart of a method of wireless communication in accordance with this disclosure.

FIG. 6 is a flowchart 600 of a method of wireless communication in accordance with the systems and methods described herein. In a block 602, a UE may receive information as part of a handover command. The information may be received from a serving cell. Additionally, the information may include radio resource information used in a neighboring cell for V2X communications. For example, a UE 104, 350, 464, 466, 468, 470, (a UE in vehicle 510, 516) receives information as part of a handover command. The information is received from a serving cell and may include radio resource information used in a neighboring cell for V2X communications.

In a block 604, the UE may transmit a request for V2X communication resources based on receiving the information. For example, the UE 104, 350, 464, 466, 468, 470, (a UE in vehicle 510, 516) may transmit a request for V2X communication resources based on receiving the information. In some examples, the resources may include at least one of the following resources: Mode 1 resources of a target cell, a Mode 2 resources of the target cell, a Semi-Persistent Scheduling (SPS) information, or an exception pool.

In a block 606, the UE may transmit an indication that resources are needed for a V2X application. For example, the UE 104, 350, 464, 466, 468, 470, (a UE in vehicle 510, 516) transmits an indication that resources are needed for a V2X application, e.g., such as V2V communications that allow for driverless vehicles. For example, the indication may include data such as an active bit in a field to indicate resources are needed for a V2X application. In an example, the bit may be a predetermined bit in a field of a control message.

In a block 608, the UE may transmit the UE's vehicle speed. For example, the UE 104, 350, 464, 466, 468, 470, (a UE in vehicle 510, 516) transmits vehicle speed. Vehicle speed may be used to make decisions regarding handovers or cell reselections.

Figure 7:
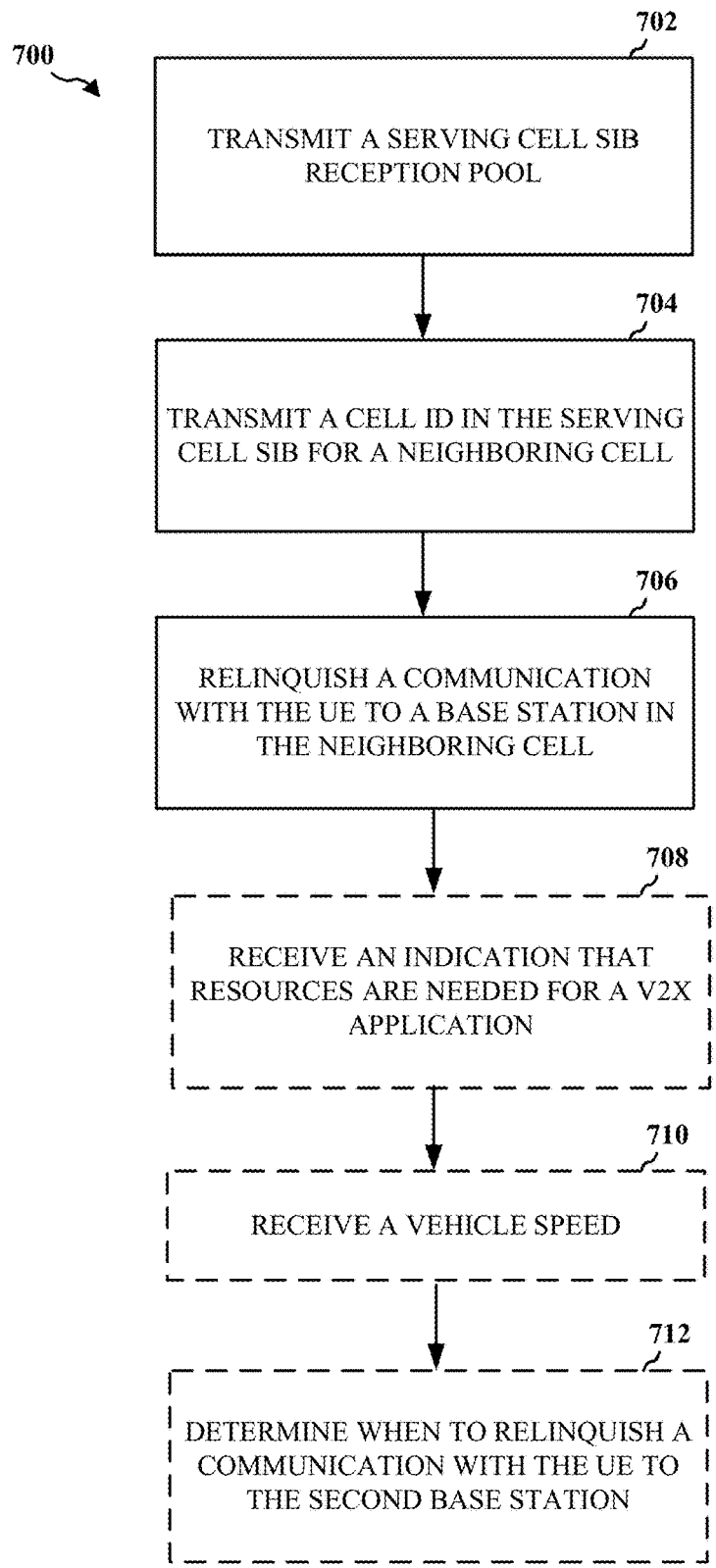
FIG. 7 is a flowchart of a method of wireless communication in accordance with this disclosure.

FIG. 7 is a flowchart 700 of a method of wireless communication in accordance with the systems and methods described herein. In a block 702, a base station may transmit a SIB reception pool of a serving cell to a UE. The transmission may be received, for example, by a UE. In an example, a base station 102, 310, 462, 502, 504 transmits a serving cell SIB to a UE 104, 350, 464, 466, 468, 470, (a UE in vehicle 510, 516). The SIB includes a reception pool. The transmission may be received, for example, by a UE 104, 350, 464, 466, 468, 470, (a UE in vehicle 510, 516).

In a block 704, the base station may transmit a cell ID for a neighboring cell in the serving cell SIB. The reception pool may be a transmission pool for the neighboring cell. The cell ID may be received, for example, by a UE. For example, the base station 102, 310, 462, 502, 504 transmits a cell ID in the serving cell SIB for a neighboring cell 506, 508. The reception pool is a transmission pool for the neighboring cell 506, 508. The cell ID may be received, for example, by a UE 104, 350, 464, 466, 468, 470, (a UE in vehicle 510, 516).

In a block 706, the base station may relinquish communication with the UE to a base station in the neighboring cell. The UE may then be in communication with the base station in the neighboring cell. For example, the base station 102, 310, 462, 502, 504 relinquishes a communication with the UE 104, 350, 464, 466, 468, 470, (a UE in vehicle 510, 516) to a base station 102, 310, 462, 502, 504 in the neighboring cell 506, 508. The UE 104, 350, 464, 466, 468, 470, 510, 516 may then be in communication with the base station 102, 310, 462, 502, 504 in the neighboring cell 506, 508.

In a block 708, the base station may receive an indication that resources are needed for a V2X application. For example, the base station 102, 310, 462, 502, 504 may receive an indication that resources are needed for a V2X application, e.g., from a UE 104, 350, 464, 466, 468, 470, (a UE in vehicle 510, 516).

In a block 710, the base station may receive a vehicle speed. For example, the base station 102, 310, 462, 502, 504 may receive a vehicle speed, e.g., from a UE 104, 350, 464, 466, 468, 470, (a UE in vehicle 510, 516). The vehicle speed may be of a speed of a vehicle carrying the UE 104, 350, 464, 466, 468, 470, (a UE in vehicle 510, 516). The vehicle speed may be determined by the UE 104, 350, 464, 466, 468, 470, (a UE in vehicle 510, 516) and based on the speed that the UE 104, 350, 464, 466, 468, 470, (a UE in vehicle 510, 516) is moving.

In a block 712, the base station may determine when to relinquish a communication with the UE to the second base station in the neighboring cell based on vehicle speed. For example, the base station 102, 310, 462, 502, 504 may determine when to relinquish a communication with the UE 104, 350, 464, 466, 468, 470, (a UE in vehicle 510, 516) to the second base station 102, 310, 462, 502, 504 in the neighboring cell 506, 508 based on vehicle speed. (For example, if location and direction of travel is known, speed may, in some cases, be used to predict when a UE 104, 350, 464, 466, 468, 470, (a UE in vehicle 510, 516) may leave a cell.)

Figure 8:
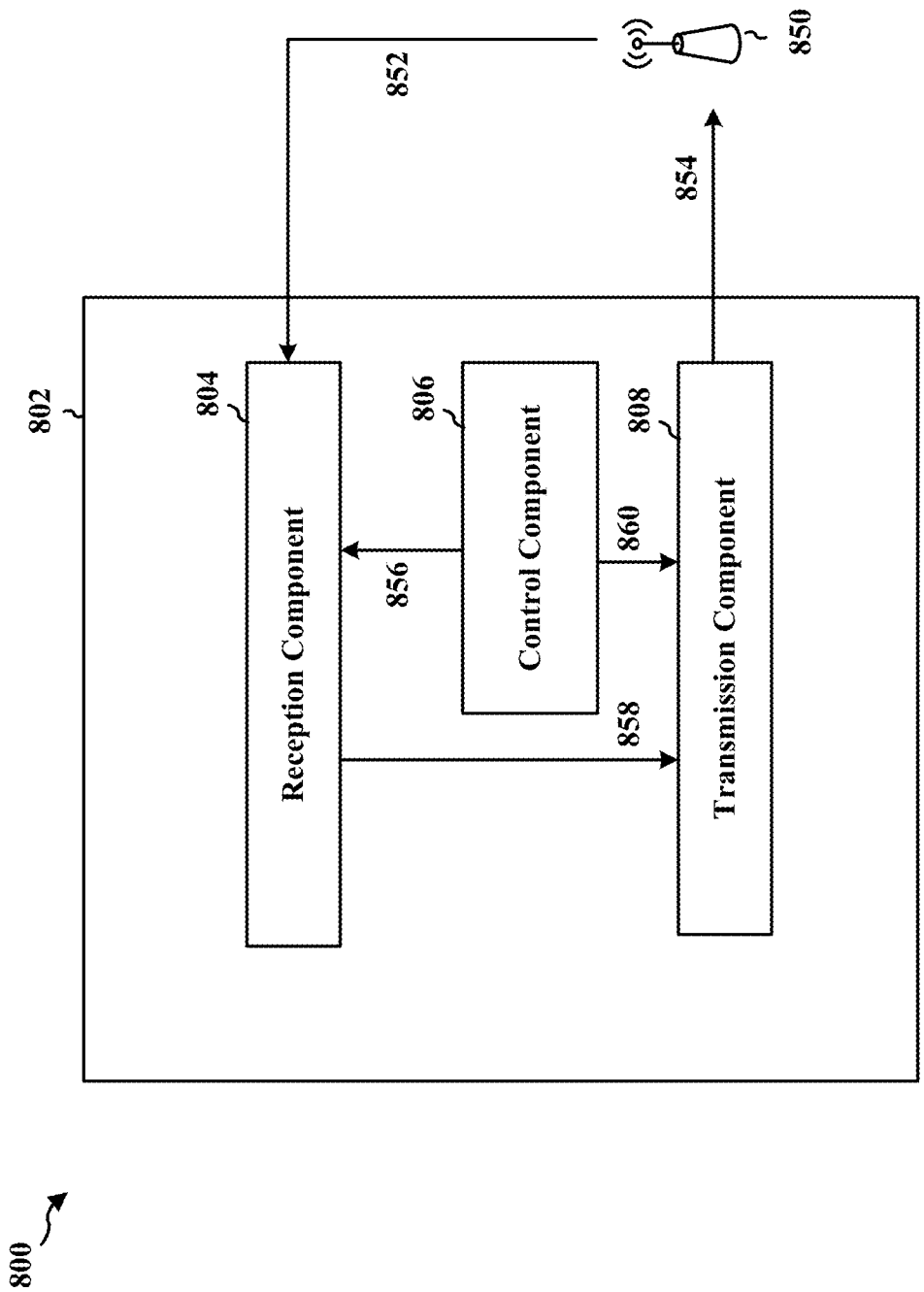
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus may be a UE. The apparatus includes a reception component 804 that receives transmissions 852, a control component 806 that may control the apparatus, and a transmission component 808 that transmits transmissions 854. The transmission 852 may be communicated to the control component 806 and the control component 806 may communicate control information to the reception component 804 at data path 856. The transmission 852 may be communicated to the transmission component 808 at data path 858. Control component 806 may communicate control information or pass other information to the transmission component 808 at data path 860.

The apparatus may include additional components that perform each of the blocks of the algorithm in the aforementioned flowchart of FIG. 6. As such, each block in the aforementioned flowcharts of FIG. 6 may be performed by a component and the apparatus may include one or more of the components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
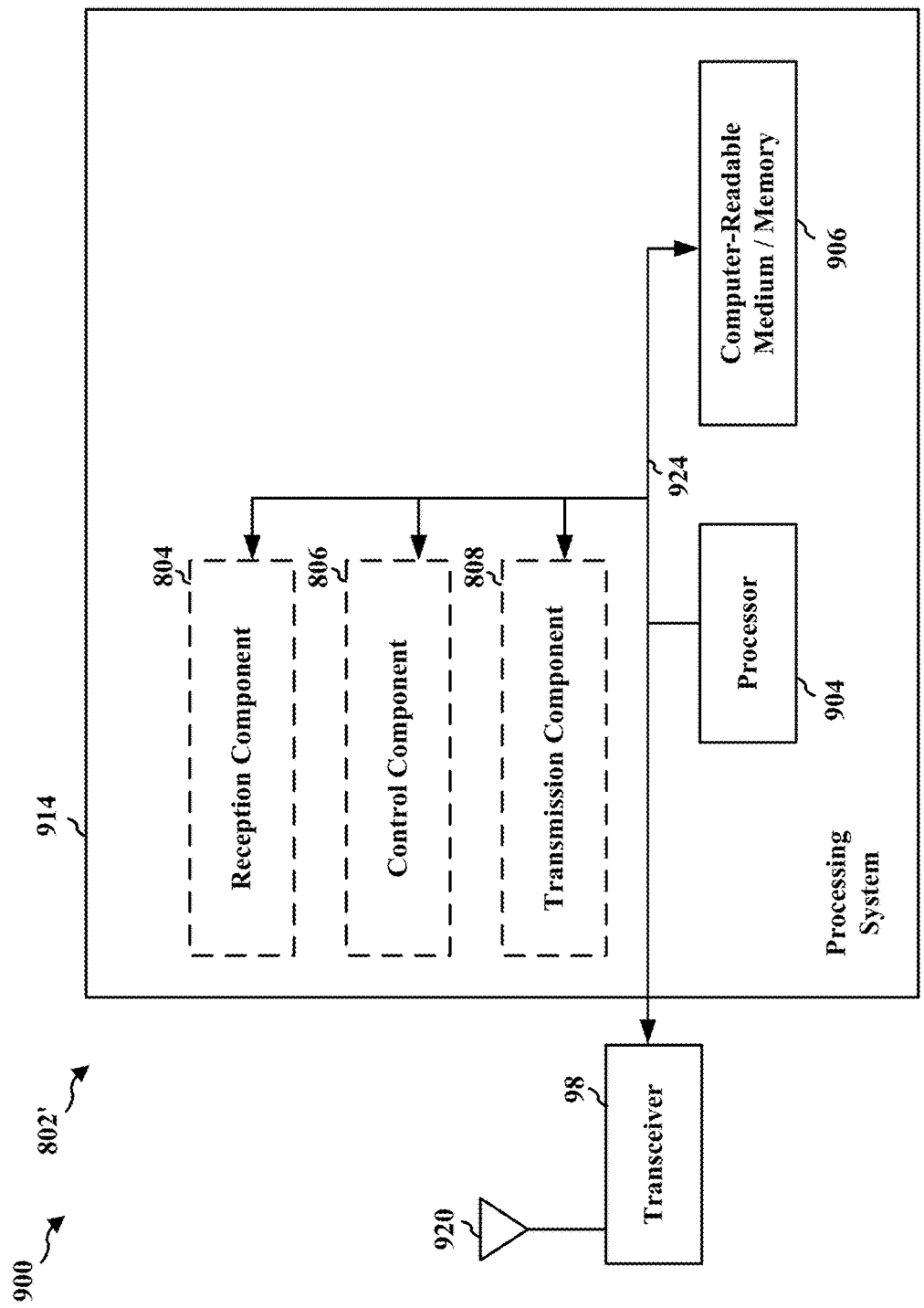
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 808, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The control component 806 may control the processing system 914. The processing system 914 further includes at least one of the components 804, 806, 808. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359.

In one configuration, the apparatus 802/802' for wireless communication includes means for means for receiving information as part of a handover command. The information may be received from a serving cell. Additionally, the information may include radio resource information used in a neighboring cell for V2X communications. Additionally, the apparatus 802/802' for wireless communication includes means for transmitting a list of resources based on the radio resource information. The list of resources may include at least one of the following resources: Mode 1 resources of a target cell, a Mode 2 resources of the target cell, a Semi-Persistent Scheduling (SPS) information, or an exception pool.

The apparatus 802/802' for wireless communication may include means for transmitting an indication that resources are needed for a V2X application or means for transmitting vehicle speed.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
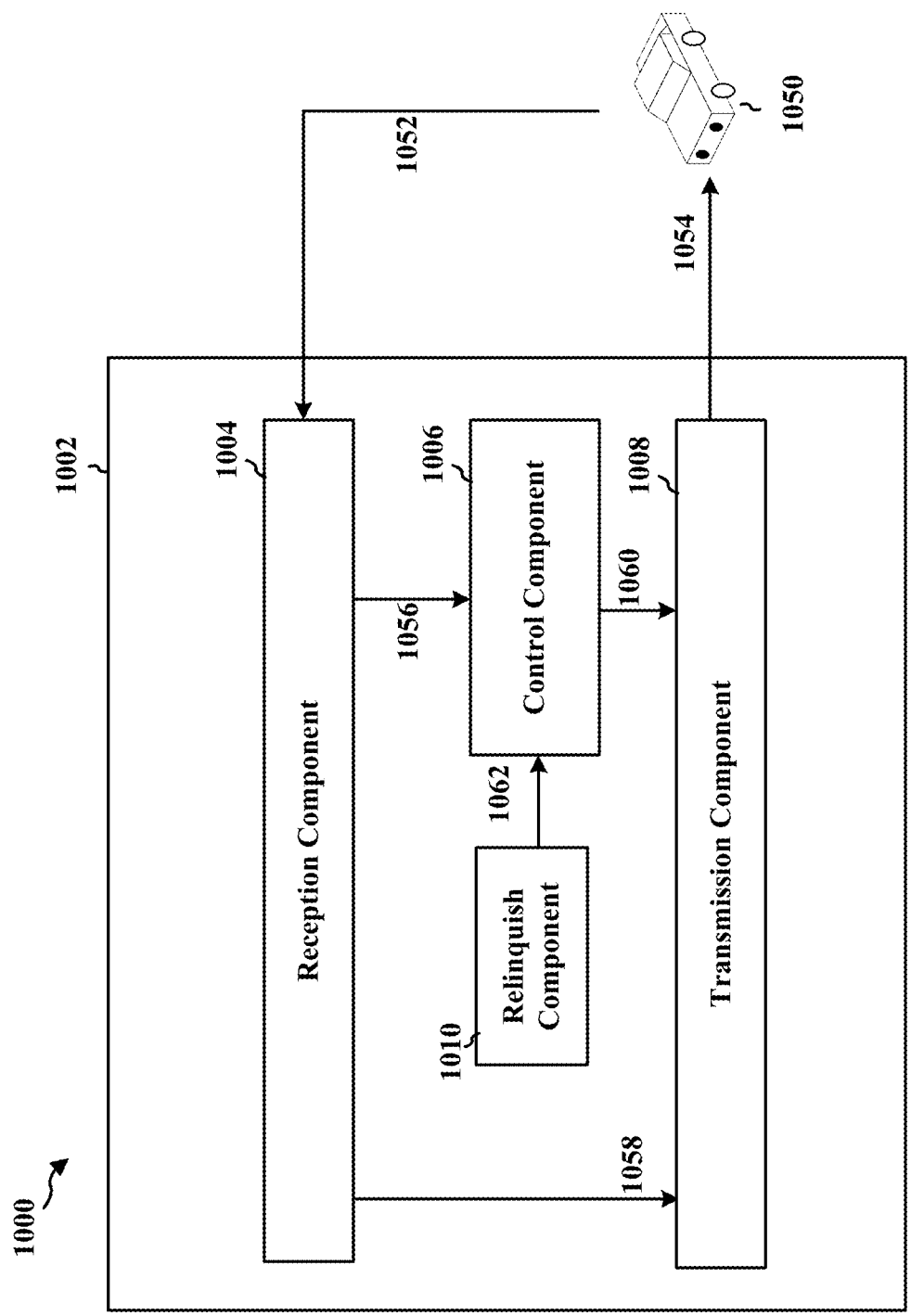
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be an eNB. The apparatus includes a reception component 1004 that receives transmissions 1052, a control component 1006 that may control the apparatus 1002, and a transmission component 1008 that transmits transmissions 1054. The transmission 1052 may be communicated to the control component 1006 and the control component 1006 may communicate control information to the reception component 1004 at data path 1056. The transmission 1052 may be communicated to the transmission component 1008 at data path 1058. Control component 1006 may communicate control information or pass other information to the transmission component 1008 at data path 1060. Relinquish component 1010 may communicate with control component 1006 at data path 1062.

The apparatus may include additional components that perform each of the blocks of the algorithm in the aforementioned flowcharts of FIG. 7. As such, each block in the aforementioned flowcharts of FIG. 7 may be performed by a component and the apparatus may include one or more of the components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
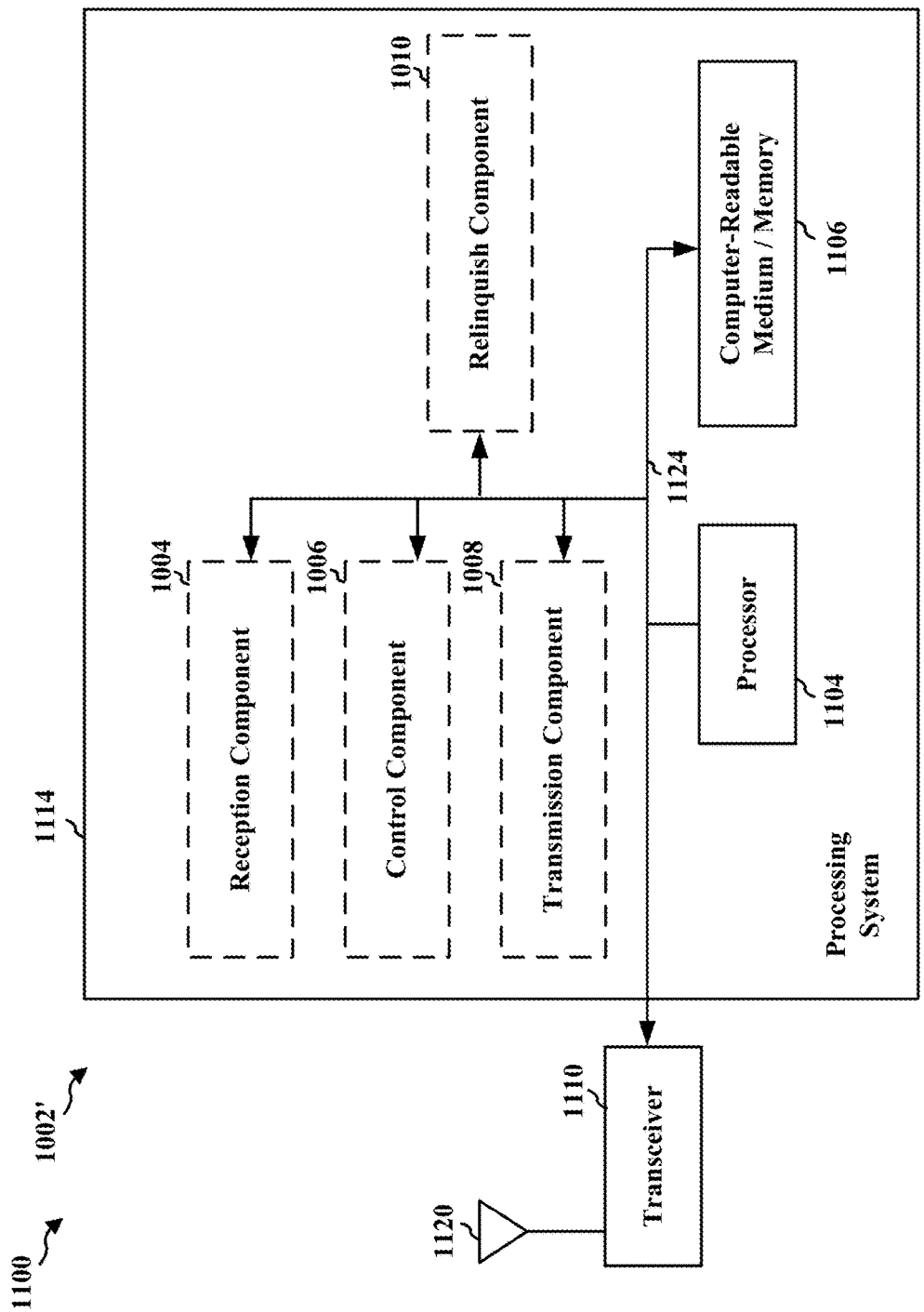
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1008, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008. The components may be software components running in the processor 1104, resident/stored in the computer readable medium/memory 1106, one or more hardware components coupled to the processor 1104, or some combination thereof. The processing system 1114 may be a component of the eNB 310 and may include the memory 376 and/or at least one of the TX processor 316, the RX processor 370, and the controller/processor 375.

In one configuration, the apparatus 1002/1002' for wireless communication includes means for transmitting a serving cell SIB reception pool to a UE. The SIB includes a reception pool. The apparatus 1002/1002' for wireless communication also includes means for transmitting a cell identification (ID) in the serving cell SIB for a neighboring cell. The reception pool is a transmission pool for the neighboring cell. Additionally, the apparatus 1002/1002' for wireless communication includes means for relinquishing a communication with the UE to a base station in the neighboring cell, e.g., control component 1006.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    receiving at the UE, information as part of a handover command, the information received from a serving cell and including radio resource information used in a neighboring cell for vehicle-to-x (V2X) communications, the information further including a cell identification (ID) for a neighboring cell reception pool and a list of resources based on the radio resource information, the list of resources including: Mode 2 resources of the target cell, the Mode 2 resources including resources for the UE autonomous selection mode;
    transmitting, from the UE, a V2X communication using at least one of the resources in the list of resources before a handover to a neighboring cell is completed.

2. The method of claim 1, wherein the neighboring cell reception pool is a transmission pool for the neighboring cell.

3. The method of claim 1, further comprising transmitting an indication that resources are needed for a V2X application.

4. The method of claim 1, further comprising transmitting a vehicle speed of the vehicle in the V2X communications.

5. The method of claim 1, wherein the UE uses a resource from the list of resources after the UE is synchronized to the target cell.

6. The method of claim 1, wherein the information received indicates that a neighboring cell reception pool is used as transmission pool in the neighboring cell before reading a system information block (SIB) from the neighboring cell.

7. The method of claim 6, wherein the information received is used for urgent messages.

8. The method of claim 6, wherein the information received is used for all messages.

9. The method of claim 1, wherein the information received indicates how long a neighboring cell reception pool is used as a transmission pool in the neighboring cell before reading a system information block (SIB) from neighboring cell.

10. The method of claim 9, wherein the information received is used before reading the SIB directly from the neighboring cell.

11. The method of claim 1, wherein the list of resources includes each of Mode 1 resources of a target cell, Mode 2 resources of the target cell, Semi-Persistent Scheduling (SPS) information resources, and further includes exception pool resources.

12. A method of wireless communication at a base station, comprising:
    transmitting a system information block (SIB) for a serving cell to a UE in a vehicle-to-x (V2X) communication, the SIB including a reception pool;
    transmitting a cell identification (ID) of a neighboring cell in the serving cell SIB, wherein the reception pool is a transmission pool for the neighboring cell, the transmission pool including a resource that may be used for V2X communication before a handover to a second base station is completed, the resource including Mode 2 resources of the target cell, the Mode 2 resources including resources for the UE autonomous selection mode; and
    relinquishing a communication with the UE to the second base station in the neighboring cell.

13. The method of claim 12, further comprising receiving an indication that resources are needed for a V2X application.

14. The method of claim 12, further comprising receiving a vehicle speed of the vehicle in the V2X communications.

15. The method of claim 12, further comprising determining when to relinquish a communication with the UE to the second base station in the neighboring cell based on vehicle speed of a vehicle in a V2X communications.

16. An apparatus comprising:
    a memory; and
    at least one processor coupled to the memory and configured to:
        receive information as part of a handover command, the information received from a serving cell and including radio resource information used in a neighboring cell for vehicle-to-x (V2X) communications, the information further including a cell identification (ID) for a neighboring cell reception pool and a list of resources based on the radio resource information, the list of resources including: Mode 2 resources of the target, the Mode 2 resources including resources for the UE autonomous selection mode; and
        transmit, from the UE, a V2X communication using at least one of the resources in the list of resources before a handover to the neighboring cell is completed.

17. The apparatus of claim 16, wherein the neighboring cell reception pool is a transmission pool for the neighboring cell.

18. The apparatus of claim 16, wherein the at least one processor is further configured to transmit an indication that resources are needed for a V2X application.

19. The apparatus of claim 16, wherein the at least one processor is further configured to transmit a vehicle speed of the vehicle in the V2X communications.

20. The apparatus of claim 16, wherein the at least one processor is further configured to use a resource from the list of resources after the apparatus is synchronized to the target cell.

21. The apparatus of claim 16, wherein the at least one processor is further configured to receive information that indicates that a neighboring cell reception pool is used as transmission pool in the neighboring cell before reading a system information block (SIB) from the neighboring cell.

22. The apparatus of claim 21, wherein the at least one processor is further configured to use the information received for urgent messages only.

23. The apparatus of claim 21, wherein the at least one processor is further configured to use the information for all messages.

24. The apparatus of claim 16, wherein the information received indicates how long the neighboring cell reception pool is used as a transmission pool in the neighboring cell before reading a system information block (SIB) from neighboring cell.

25. The apparatus of claim 24, wherein the at least one processor is further configured to use the information before reading the SIB directly from the neighboring cell.

26. A apparatus, comprising:
a memory; and
at least one processor coupled to the memory and configured to:
transmit a serving cell SIB to a UE in a vehicle-to-x (V2X) communication, the SIB including a reception pool;
transmit a cell identification (ID) in the serving cell SIB for a neighboring cell, wherein the reception pool is a transmission pool for the neighboring cell the transmission pool including a resource that may be used for V2X communication before a handover to a second base station is completed, the resource comprising Mode 2 resources of the target cell, the Mode 2 resources including resources for the UE autonomous selection mode; and
relinquish a communication with the UE to a base station in the neighboring cell.

27. The apparatus of claim 26, wherein the at least one processor is further configured to receive an indication that resources are needed for a V2X application.

28. The apparatus of claim 26, wherein the at least one processor is further configured to receive a vehicle speed of the vehicle in the V2X communications.

29. The apparatus of claim 26, wherein the at least one processor is further configured to determine when to relinquish a communication with the UE to the base station in the neighboring cell based on vehicle speed.

* * * * *